United States Patent [19]

Worsley

[11] 4,240,541
[45] Dec. 23, 1980

[54] APPARATUS FOR MOVING MATERIALS

[75] Inventor: Gilbert P. Worsley, Ormskirk, England

[73] Assignee: G. P. Worsley & Company Limited, Great Britain

[21] Appl. No.: 886,018

[22] Filed: Mar. 13, 1978

[30] Foreign Application Priority Data

Mar. 12, 1977 [GB] United Kingdom .............. 10572/77
Aug. 9, 1977 [GB] United Kingdom .............. 33229/77

[51] Int. Cl.³ ........................................... B65G 65/16
[52] U.S. Cl. ................................. 198/518; 198/519
[58] Field of Search ............... 198/518, 519, 510, 508, 198/666, 513, 669; 214/10, 16 R; 37/81, 88; 414/133

[56] References Cited

U.S. PATENT DOCUMENTS

| 2,641,356 | 6/1953 | Hunter et al. | 198/666 X |
| 3,023,560 | 3/1962 | Krahn | 198/518 X |
| 3,088,718 | 5/1963 | Lilly | 198/518 X |
| 3,282,408 | 11/1966 | Lohrentz | 198/518 |
| 3,438,584 | 4/1969 | Klein | 198/508 X |
| 3,538,995 | 11/1970 | Buligan | 198/519 X |
| 3,703,952 | 11/1972 | Kuhn et al. | 198/611 X |
| 4,056,189 | 11/1966 | Freed | 198/518 |

FOREIGN PATENT DOCUMENTS 35556 11/1965 German Democratic Rep. ...... 198/657

*Primary Examiner*—Jeffrey V. Nase
*Assistant Examiner*—Douglas D. Watts
*Attorney, Agent, or Firm*—William A. Drucker

[57] ABSTRACT

Apparatus for removing or reclaiming material from a stockpile or other mass of material, comprising an elongate bladed member drivable to rotate about an axis longitudinal thereof, a frame carrying said bladed member and drivable to move the bladed member bodily sideways into the material to be removed or reclaimed and thereby transfer such material across the bladed member to a position rearwardly thereof.

4 Claims, 6 Drawing Figures

APPARATUS FOR MOVING MATERIALS

The invention relates to apparatus for removing or reclaiming material from a stockpile or other mass of such material, and to stockpiling and reclaiming systems utilizing such apparatus.

Our Patent Specification No. 1,256,272 and our Patent Application No. 46637/75 relate to apparatus for this purpose including a ramped portion that is drivable into the material for removal via a conveyor running transversely of the ramped portion. It is an objet of this invention to provide an alternative type of apparatus having a generally smaller overall size, in particular removing the requirement for a ramped portion or portions.

According to the invention there is provided apparatus for removing or reclaiming material from a stockpile or other mass of material, the apparatus comprising an elongate bladed means adapted to be rotated about an axis longitudinal thereof and moved bodily sideways into the material to be removed or reclaimed so as to transfer such material across the bladed means to a position relatively rearwardly thereof. In general, it will be most convenient for the bladed means to run close to a rear shield or guide plate of lower height, preferably up to half, then the space occupied in rotation by the bladed means.

The bladed means may utilize rotary plough blades, or even scoop like blades, perhaps preferably of curved and sloping-edged form, but a preferred form is of a wormscrew of discontinuous sectional construction. One particularly advantageous blading arrangement is of successively oppositely handed part turns of wormscrew, usually up to or exceeding a half-turn, and in approximate anti-phase with each other. In such a structure, feed-through of material across the bladed member is enhanced by the natural tendency of each blade to translate material along the length of the member as these are successively opposite leading to substantial lifting and side-to-side "swilling" of material at the rear of the member and over a rear curved shield. Preferably, the bladed member and its associated drive means is carried by a movable frame, such as a gantry or beam spanning the work position.

Usually, apparatus embodying the invention will include accommodation for a conveyor to run behind the "screw" so as to collect the material therefrom and take it away from the general area of the stockpile. A suitable such conveyor system may be integral with or secured relative to the movable supporting frame for the apparatus, such as the aforesaid gantry.

It may be preferred for apparatus embodying the invention to be provided with two bladed members, one on each side of the apparatus and preferably separated by a material removal conveyor or housing therefor. Such an arrangement will allow two aligned stockpiles to be reclaimed for opposite directions of a single linear run of the apparatus as a whole. Where, as is common, stockpiles are arranged in parallel rows it is not of course necessary for the stockpiles for the various rows to be in register as means may be provided for translating the reclaiming apparatus as a whole along a path between rows of stockpiles.

A preferred bladed member is made up in modular lengths with bearings between such lengths. To avoid build up of material in front of such bearings it is advantageous to provide forwardly extending deflection means, say in the form of a forwardly convergent deflector.

Deflection means may also be provided at each end of a complete bladed member to collect and avoid spreading of material of the stockpile edges. If desired revolving feed means, such as a full worm screw member, may be provided to feed into each end of the bladed member.

Specific implementation of the invention will now be specifically described, by way of example, with reference to the accompanying drawings, in which.

Figure 1:
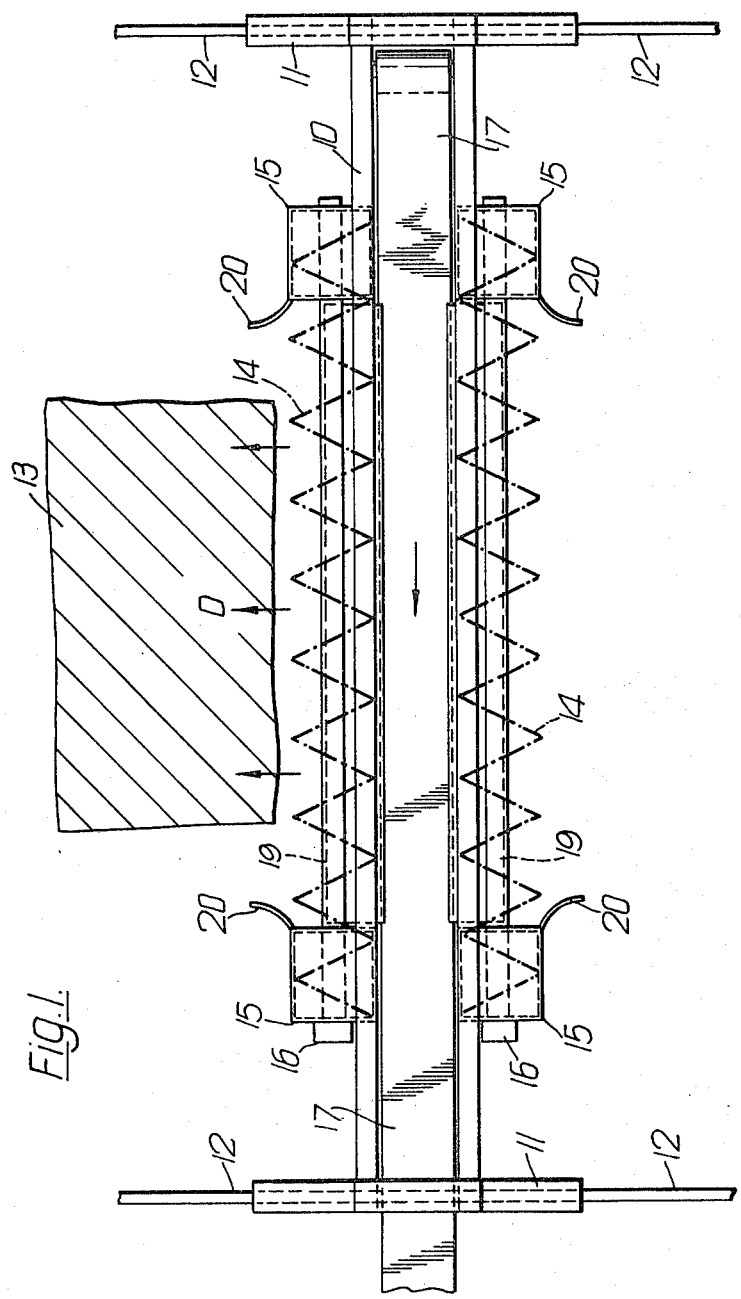
FIG. 1 is a plan view of reclaiming apparatus in the form of a movable frame carrying two bladed members and a central conveyor.

In FIG. 1, a frame or beam 10 is supported by bogeys 11 at its ends which run on transverse rails 12 to move the beam towards a material stockpile 13. One each side of the beam is mounted a bladed member 14. Each member 14 is supported at its ends by a bearing block 15, at least one of which incorporates drive means 16 for rotating the screw about its longitudinal axis. Between the two members 14 and within the beam-like frame 10 is a flight conveyor 17, operable to carry material along the machine to be dispensed in known manner into a hopper or the like, for example as disclosed in our application No. 43646/76.

In use, the beam is driven in the direction of the arrow D with at least the leading bladed member rotating. When the bladed member engages the stockpile, material is fed through onto the conveyor.

Lifting of the material onto the conveyor is assisted by shield or guide plate 19 which extends along the length of, and behind each bladed member 14. The plate 19 has a curved section extending circumferentially around the rear lower part of the bladed member.

Figure 2:
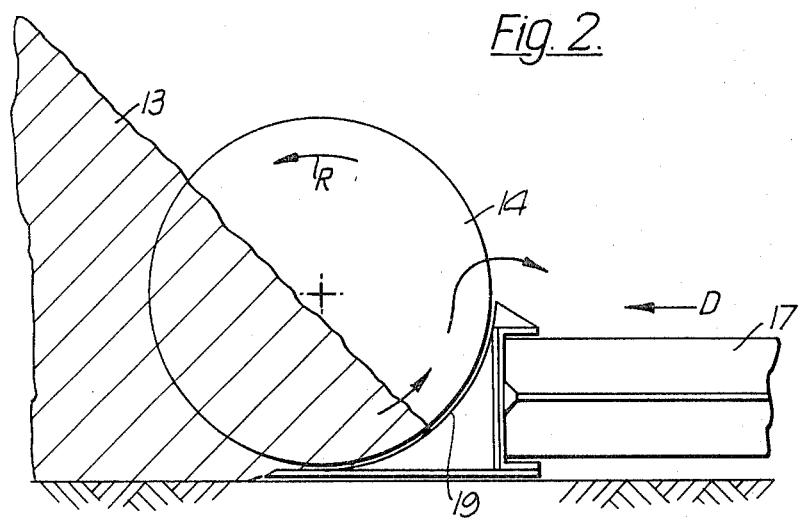
FIG. 2 is a generally schematic side sectional view of a part of the apparatus of FIG. 1.

The combination of rotational movement of the bladed member in the direction of arrow R and translational movement thereof and its shield plate into the stockpile in the direction D causes the material to be driven up the curved section 19 and onto the conveyor, which conveyor removes the material in a direction parallel to the axis of rotation of the bladed member, i.e. out of the plane of FIG. 2.

Figure 3:
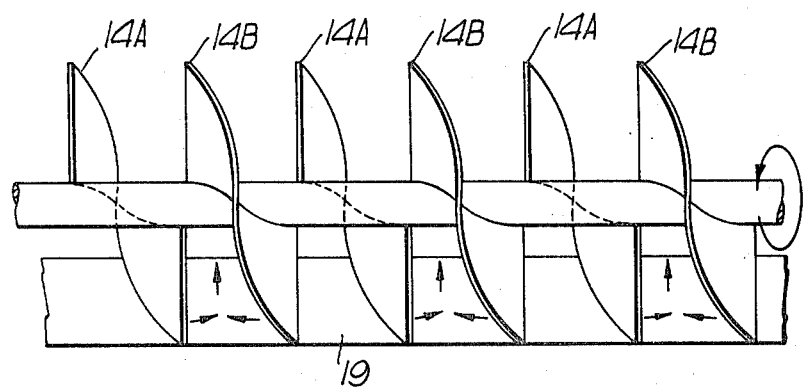
FIG. 3 is a fragmentary view of parts of a bladed member.

The preferred blading arrangement of the member 14 is, as indicated in FIG. 3, for successive blades 14A and 14B to comprise part turns of a worm-screw and to be of opposite hands in substantially opposite phase, i.e. successive blades being centred at opposite sides of a common shaft. These blades are shown at starting or ending at or near the axial shaft position of the start or end of the adjacent blade and extending over at least 180° of the shaft periphery. The resulting action on rotation and forward movement is that stockpile material is moved both backwards generally underneath the bladed shaft and axially thereof in opposite directions between successive blades with an action rearwardly of the bladed shaft that produces alternate side lifting and "swilling" of material from side to side between blades to assist spillage thereof over the plate 19 and onto the conveyor.

Clearly, such action does not require each blade to be of constant part worm-screw pitch, nor does it require a particular extent of the blades about the shaft, but constant pitch, part-turn worm blades are believed to be most readily manufactured. Also the ends of the blades need not be radial of the shaft but can be inclined or curved as desired to reduce wear and/or reduce deleterious effects on the stockpile material, though the action is generally very gentle, and the edges and/or ends of the blades or at least first material engaging parts thereof may be specially treated or fitted with wear resistant, or even cutting, means.

Figure 4:
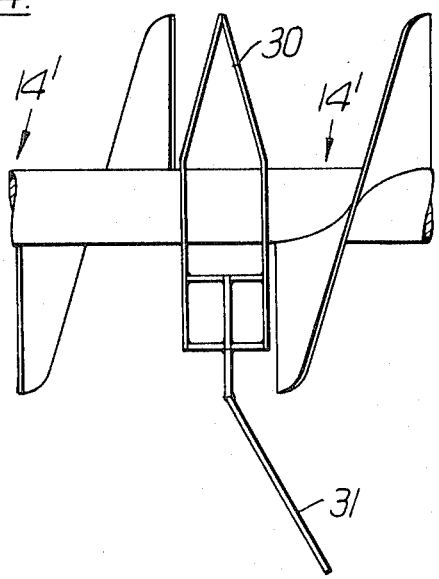
FIG. 4 is a fragmentary view of a preferred bladed member.

In the apparatus described above the bladed members 14 are shown as single members. In practice, a plurality of sections 14' of bladed means are usually mounted end-to-end (FIG. 4) along each side of the frame. Adjacent sections may have end-blade parts of a hand such as to take material away from intermediate bearing blocks that are advantageously fitted with forwardly convergent deflectors 30. Common rotation of the sections is then such that any build-up of the material at the junctions between section is avoided. Further deflectors 31 rearward of the bladed means and towards the conveyor direction are also shown.

Figure 5:
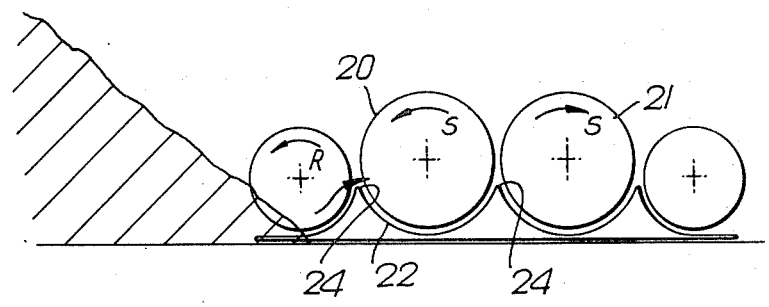
FIG. 5 is a schematic view of another embodiment.

It will be appreciated that any suitable conveyor may be used instead of the flight conveyor described above, for example a scraper chain or screw. FIG. 5 illustrates an alternative embodiment employing a conveyor in the form of two parallel screws 20 and 21 extending the width of the machine in corresponding troughs 22, 23. Each trough is of curved section to conform closely with the worm-screw and is joined to the bladed means shield 19 by a ridge 24. The conveyor screws rotate in opposite directions as indicated by arrows S.

When the machine is operating material is transferred from the bladed means 14 over the ridge 24 and is then removed axially by the screw conveyor.

Figure 6:
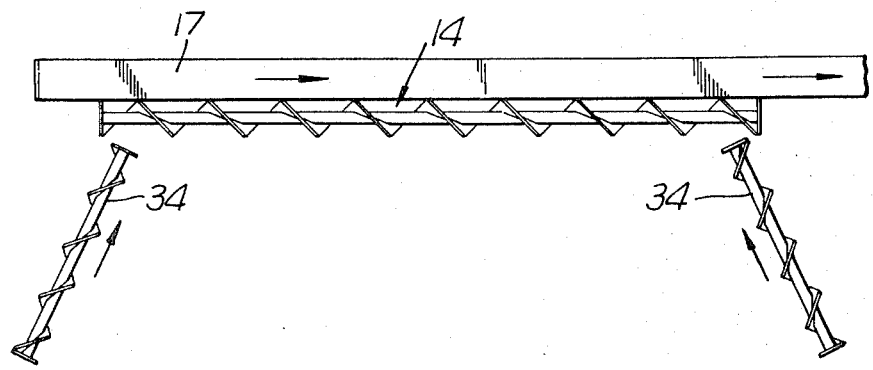
FIG. 6 is a schematic view showing a further modification.

To avoid spillage from, and aid collection of material towards, the ends of an overall bladed means 14, and in addition to the normal use of end-adjacent plough blades of hands to move material inwardly thereof, further worm-screw like plough collectors 34 are shown (FIG. 6) extending forwardly of, perhaps even inclined upwardly from, the main device in a generally divergent manner to promote infeeding of stock pile material to the main reclaimer lifting mechanism.

The apparatus may be driven in a direction opposite to the arrow D to engage the opposite bladed means with another stockpile.

Provision may be made for translational movement of the entire apparatus along a path between two rows of stockpiles. Such systems are particularly valuable where passageways between rows of stockpiles either share stockpiling and reclaiming apparatus or have stockpiling apparatus associated with alternative passageways and reclaiming apparatus associated with intervening passageways.

Whilst the reclaimer is above described as operating on a straight track it should be understood that other track configurations, for example circular, could be employed.

An advantage of apparatus embodying the present invention is its simple construction. Embodiments of the invention are suitable for moving many different materials but are specially suited to moving heavy and tightly compacted material, such as is the case for coal stockpiles.

I claim:

1. Apparatus for transferring material from a stockpile of such material at one location to another location comprising:
    a frame movable in one direction toward the stockpile,
    a guide plate secured to said frame with its surface extending downwardly and forwardly from said end for entering the stockpile,
    shaft means carried by said frame at its forward end and rotatable about an axis transverse to said direction and spaced upwardly from said guide plate,
    a plurality of blades secured to and spaced along said shaft means,
    said blades each having the form of a part-turn of a helix with adjacent blades being substantially angularly displaced and the adjacent blades of a plurality of pairs being opositely handed,
    said blades extending into close proximity to the surface of the guide element,
    whereby the adjacent blades of said a plurality of pairs are to produce side-to swilling of the material rearwardly of the blades and assist lifting thereof over said guide plate.

2. Apparatus according to claim 1 wherein the part-turns of the blades amount to approximately 180°.

3. Apparatus according to claim 1 including a movable conveyor associated with said frame means and rearwardly of said guide plate to receive material lifted over the guide plate by rotation of said blades.

4. Apparatus according to claim 3 wherein the part-turns of the blades amount to approximately 180°.

* * * * *